(12) United States Patent
He et al.

(10) Patent No.: US 12,720,151 B2
(45) Date of Patent: Aug. 25, 2026

(54) IDENTIFYING AND MARKING VIDEO DATA UNITS FOR NETWORK TRANSPORT OF VIDEO DATA

(71) Applicant: QUALCOMM Incorporated, San Diego, CA (US)

(72) Inventors: Yong He, San Diego, CA (US); Muhammed Zeyd Coban, Carlsbad, CA (US); Prashanth Haridas Hande, San Diego, CA (US); Imed Bouazizi, Frisco, TX (US); Nikolai Konrad Leung, San Francisco, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 212 days.

(21) Appl. No.: 18/329,994

(22) Filed: Jun. 6, 2023

(65) Prior Publication Data

US 2024/0146994 A1 May 2, 2024

Related U.S. Application Data

(60) Provisional application No. 63/381,902, filed on Nov. 1, 2022.

(51) Int. Cl.
*H04N 21/435* (2011.01)
*H04N 19/169* (2014.01)
(Continued)

(52) U.S. Cl.
CPC ......... *H04N 21/435* (2013.01); *H04N 19/188* (2014.11); *H04N 19/70* (2014.11); *H04N 21/6437* (2013.01)

(58) Field of Classification Search
CPC .... H04N 21/435; H04N 19/188; H04N 19/70; H04N 21/6437
See application file for complete search history.

(56) References Cited

U.S. PATENT DOCUMENTS

2013/0107973 A1* 5/2013 Wang .................... H04N 19/82 375/E7.193
2014/0036999 A1* 2/2014 Ryu .................... H04N 19/159 375/240.12
(Continued)

FOREIGN PATENT DOCUMENTS

WO WO-2014004391 A1 * 1/2014 .......... H04N 19/463
WO 2021122070 A1 6/2021
(Continued)

OTHER PUBLICATIONS

3GPP TR 23.700-60, "3rd Generation Partnership Project: Technical Specification Group Services and System Aspects: Study on XR (Extended Reality) and Media Services (Release 18)", 3GPP TR 23.700-60, V0.3.0, May 2022, pp. 1-217.
(Continued)

*Primary Examiner* — Maria E Vazquez Colon
(74) *Attorney, Agent, or Firm* — Shumaker & Sieffert, P.A.

(57) ABSTRACT

An example device for retrieving media data includes a memory; and a processing system comprising one or more processors implemented in circuitry, the processing system being configured to: receive a packet including a packet header and a payload including at least a portion of a frame of video data, the packet header being separate from the payload; extract, from the packet header, a video frame identifier for the frame of video data; and process the payload according to the video frame identifier.

41 Claims, 7 Drawing Sheets

(51) Int. Cl.
*H04N 19/70* (2014.01)
*H04N 21/6437* (2011.01)

(56) References Cited

U.S. PATENT DOCUMENTS

| | | | | |
|---|---|---|---|---|
| 2014/0049604 | A1 | 2/2014 | Chen et al. | |
| 2014/0086315 | A1 | 3/2014 | Zhang et al. | |
| 2015/0271525 | A1* | 9/2015 | Hendry | H04N 19/107 375/240.27 |
| 2016/0014729 | A1* | 1/2016 | Wentink | H04W 72/23 370/329 |
| 2018/0077421 | A1* | 3/2018 | Sablin | H04N 19/895 |
| 2018/0359297 | A1* | 12/2018 | Mihály | H04L 65/80 |
| 2021/0211524 | A1* | 7/2021 | Jiang | H04B 17/26 |
| 2022/0217413 | A1* | 7/2022 | Hendry | H04N 19/46 |
| 2024/0214864 | A1* | 6/2024 | Zong | H04W 76/12 |
| 2024/0297910 | A1* | 9/2024 | Shen | H04N 21/434 |
| 2025/0247738 | A1* | 7/2025 | Pan | H04L 47/28 |

FOREIGN PATENT DOCUMENTS

| | | | | |
|---|---|---|---|---|
| WO | WO-2022144184 A1 * | 7/2022 | | H04N 19/70 |
| WO | WO-2024055871 A1 * | 3/2024 | | H04W 28/0268 |

OTHER PUBLICATIONS

International Search Report and Written Opinion—PCT/US2023/024836—ISA/EPO—Aug. 31, 2023, 14 Pages.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

KDDI: "KI#5, Sol#24: Miscellaneous Correction to Solution#24", 3GPP TSG-WG SA2 Meeting #152E e-meeting, S2-2206607, Type PCR, FS_XRM, 3rd Generation Partnership Project, Mobile Competence Centre, 650, Route Des Lucioles, F-06921 Sophia-Antipolis Cedex, France, vol. 3GPP SA 2, No. Online, Aug. 17, 2022-Aug. 26, 2022, Aug. 10, 2022, 6 pages, XP052185002, p. 2.

Zanaty M., et al., "Frame Marking RTP Header Extension draft-ietf-avtext-Framemarking-13", Cisco Systems, Network Working Group, Nov. 2021, pp. 1-17.

* cited by examiner

IDENTIFYING AND MARKING VIDEO DATA UNITS FOR NETWORK TRANSPORT OF VIDEO DATA

This application claims the benefit of U.S. Provisional Application No. 63/381,902, filed Nov. 1, 2022, the entire contents of which are hereby incorporated by reference.

TECHNICAL FIELD

This disclosure relates to transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques related to signaling characteristics of media data contained in a network packet in a header of the packet. Such characteristics may include, for example, an identifier for the media data (e.g., for a slice of a picture and/or for the picture). The identifier may indicate, or be related to, whether the media data can be discarded in certain circumstances, such as according to a random access technique used to begin reception of a bitstream including the media data. For example, if the media data depends on earlier media data of the bitstream that was not received, the packet may be discarded. Such may occur if the media data is included in a gradual decoder refresh (GDR) picture used for random access, if the media data is included in a random access skippable leading (RASL) picture, or other such instances.

In one example, a method of receiving video data includes receiving a packet including a packet header and a payload including at least a portion of a frame of video data, the packet header being separate from the payload; extracting, from the packet header, a video frame identifier for the frame of video data; and processing the payload according to the video frame identifier.

In another example, a device for receiving video data includes a memory configured to store video data and one or more processors implemented in circuitry and configured to receive a packet including a packet header and a payload including at least a portion of a frame of video data, the packet header being separate from the payload; extract, from the packet header, a video frame identifier for the frame of video data; and process the payload according to the video frame identifier.

In another example, a device for receiving video data includes means for receiving a packet including a packet header and a payload including at least a portion of a frame of video data, the packet header being separate from the payload; means for extracting, from the packet header, a video frame identifier for the frame of video data; and means for processing the payload according to the video frame identifier.

In another example, a computer-readable storage medium has stored thereon instructions that, when executed, cause a processor to receive a packet including a packet header and a payload including at least a portion of a frame of video data, the packet header being separate from the payload; extract, from the packet header, a video frame identifier for the frame of video data; and process the payload according to the video frame identifier.

The details of one or more examples are set forth in the accompanying drawings and the description below. Other features, objects, and advantages will be apparent from the description and drawings, and from the claims.

DETAILED DESCRIPTION

Figure 1:
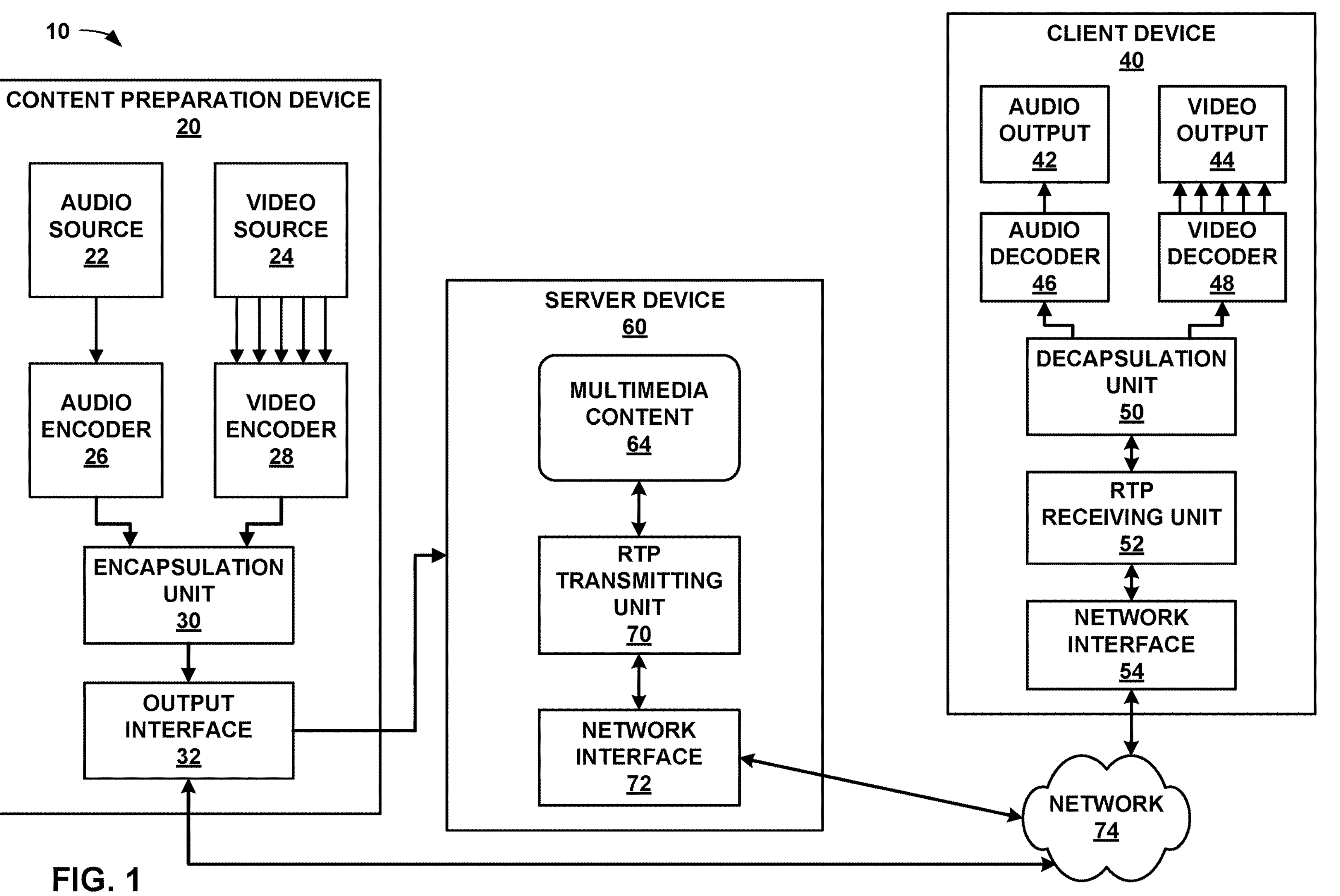
FIG. 1 is a block diagram illustrating an example system that implements techniques for streaming media data over a network.

In general, this disclosure describes techniques related to sending and receiving extended reality (XR) media data, such as augmented reality (AR), mixed reality (MR), and/or virtual reality (VR). For example, a media communication session between two network devices, such as a server device and a client device or two user equipment (UE) devices, may include audio data, video data, and/or XR data. Thus, a user may participate in an XR communication session while communicating with one or more other users. The XR communication session may correspond to an XR-based telecommunication session, a game, or the like.

Various issues related to XR and media (XRM) services are currently under study. Two issues include the use of protocol data unit (PDU) Set integrated packet handling and differentiated PDU Set handling, which are generally directed to enhancing PDU Set processing at a Fifth Generation (5G) User Plane Function (UPF) to optimize an XRM consumption experience. A PDU Set may include a plurality of PDUs, and each PDU may include data for a common presentation time. For example, a PDU Set may include PDUs including data for a frame of video data and/or graphical XR data for computer-generated graphics. Thus, a PDU Set may correspond to a video frame and each PDU may be a slice of the video frame or a network abstraction layer (NAL) unit.

In 5G system (5GS), an interface between an application domain and the 5GS may be based on quality of service (QoS) Flows. A QoS Flow is the finest granularity of QoS differentiation in the PDU Session. A QoS Flow identifier (QFI) may be used to identify a QoS Flow in the 5GS. User plane traffic with the same QFI within a PDU Session may receive the same traffic forwarding treatment.

Each PDU may correspond to, for example, a packet communicated via a computer-based network. Real-time Transport Protocol (RTP) or other protocols may be used to transport the PDUs. RTP typically is performed over uniform datagram protocol (UDP). As such, packets may be delivered out of order and UDP does not provide a packet delivery guarantee. Furthermore, packet processing at the network level generally does not have access to packet payload data (which may include video coding layer (VCL) data), because the payload data may be encrypted or otherwise inaccessible to network elements.

As such, according to the techniques of this disclosure, certain video information may be included in packet headers outside of the payload, such that the packets can be processed by network devices that cannot access the payload data. Such data may include, for example, identification information for a frame or portion of a frame of video data. The identification may specifically identify the frame, such as with a picture order count (POC) value that indicates the display order of the frame. A frame number, as another example, may indicate a coding order value of the frame, which may differ from the display order. The identification information may also (additionally or alternatively) include data representing a coding layer, such as a temporal layer identifier, that generally corresponds to a number of possible reference frames the frame may use for prediction and whether subsequent frames can use the frame as a reference frame.

In this manner, a network device or network component of a user device (e.g., user equipment) may determine, for each received packet, identifier information for media data included in a payload of the packet. Accordingly, the network device or network component may determine, for example, whether all packets of the frame have been received, whether reference frames for the frame have been received, whether subsequent frames that use the frame for reference can be decoded (due to the frame having been received or not), or the like. In this manner, the network device or network component may determine whether to, for example, provide the video data in the payload of a packet to a video decoder, whether to retrieve missing reference frames, whether to discard one or more sets of video data without sending the video data to the video decoder, or the like.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a media presentation. For example, the coded video or audio part of the media presentation can be an elementary stream. An elementary stream may be converted into a packetized elementary stream (PES) before being encapsulated within a video file. Within the same media presentation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into streamable media data.

Encapsulation unit 30 receives PES packets for elementary streams of a media presentation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points.

Server device 60 includes Real-time Transport Protocol (RTP) transmitting unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64 and include components that conform substantially to those of server device 60. In general, network interface 72 is configured to send and receive data via network 74.

RTP transmitting unit 70 is configured to deliver media data to client device 40 via network 74 according to RTP, which is standardized in Request for Comment (RFC) 3550 by the Internet Engineering Task Force (IETF). RTP transmitting unit 70 may also implement protocols related to RTP, such as RTP Control Protocol (RTCP), Real-time Streaming Protocol (RTSP), Session Initiation Protocol (SIP), and/or Session Description Protocol (SDP). RTP transmitting unit 70 may send media data via network interface 72, which may implement Uniform Datagram Protocol (UDP) and/or Internet protocol (IP). Thus, in some examples, server device 60 may send media data via RTP and RTSP over UDP using network 74.

RTP transmitting unit 70 may receive an RTSP describe request from, e.g., client device 40. The RTSP describe request may include data indicating what types of data are supported by client device 40. RTP transmitting unit 70 may respond to client device 40 with data indicating media streams, such as media content 64, that can be sent to client device 40, along with a corresponding network location identifier, such as a uniform resource locator (URL) or uniform resource name (URN).

RTP transmitting unit 70 may then receive an RTSP setup request from client device 40. The RTSP setup request may generally indicate how a media stream is to be transported. The RTSP setup request may contain the network location identifier for the requested media data (e.g., media content 64) and a transport specifier, such as local ports for receiving RTP data and control data (e.g., RTCP data) on client device 40. RTP transmitting unit 70 may reply to the RTSP setup request with a confirmation and data representing ports of server device 60 by which the RTP data and control data will be sent. RTP transmitting unit 70 may then receive an RTSP play request, to cause the media stream to be "played," i.e., sent to client device 40 via network 74. RTP transmitting unit 70 may also receive an RTSP teardown request to end the streaming session, in response to which, RTP transmitting unit 70 may stop sending media data to client device 40 for the corresponding session.

RTP receiving unit 52, likewise, may initiate a media stream by initially sending an RTSP describe request to server device 60. The RTSP describe request may indicate types of data supported by client device 40. RTP receiving unit 52 may then receive a reply from server device 60 specifying available media streams, such as media content 64, that can be sent to client device 40, along with a corresponding network location identifier, such as a uniform resource locator (URL) or uniform resource name (URN).

RTP receiving unit 52 may then generate an RTSP setup request and send the RTSP setup request to server device 60. As noted above, the RTSP setup request may contain the network location identifier for the requested media data (e.g., media content 64) and a transport specifier, such as local ports for receiving RTP data and control data (e.g., RTCP data) on client device 40. In response, RTP receiving unit 52 may receive a confirmation from server device 60, including ports of server device 60 that server device 60 will use to send media data and control data.

After establishing a media streaming session between server device 60 and client device 40, RTP transmitting unit 70 of server device 60 may send media data (e.g., packets of media data) to client device 40 according to the media streaming session. Server device 60 and client device 40 may exchange control data (e.g., RTCP data) indicating, for example, reception statistics by client device 40, such that server device 60 can perform congestion control or otherwise diagnose and address transmission faults.

Network interface 54 may receive and provide media of a selected media presentation to RTP receiving unit 52, which may in turn provide the media data to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, RTP receiving unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, RTP receiving unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via RTP receiving unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
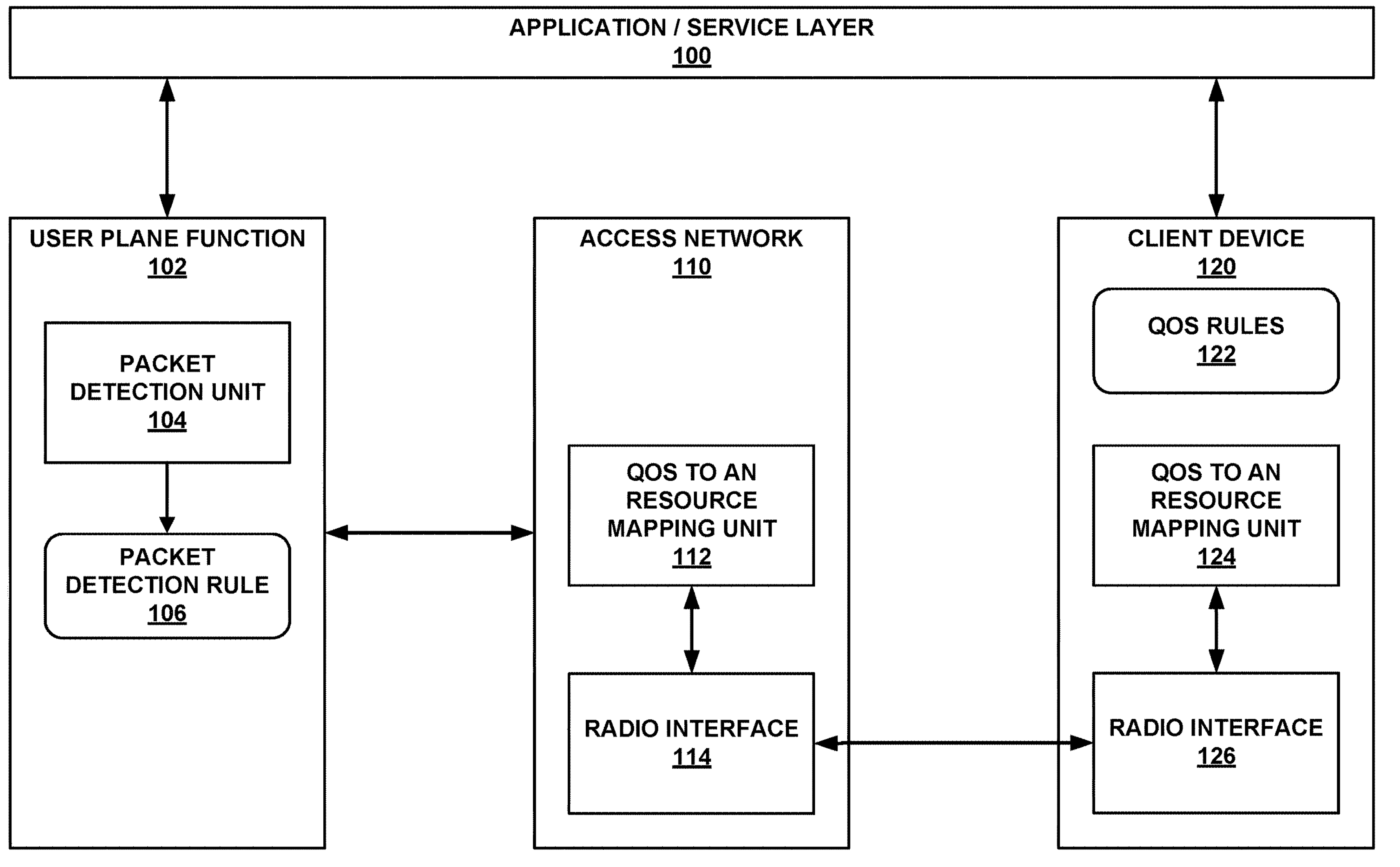
FIG. 2 is a conceptual diagram illustrating an example architecture for extended reality (XR) traffic delivery.

FIG. 2 is a conceptual diagram illustrating an example architecture for extended reality (XR) traffic delivery. FIG. 2 depicts application/service layer 100, user plane function (UPF) 102, access network (AN) 110, and client device 120. Client device 120 may correspond to client device 40 of FIG. 1 and generally include similar components to those of client device 40. UPF 102 and AN 110 may correspond to network devices within network 74 of FIG. 1.

In this example, UPF 102 includes packet detection unit 104 and packet detection rule 106, AN 110 includes quality of service (QoS) to AN resource mapping unit 112 and radio interface 114, and client device 120 includes QoS rules 122, QoS to AN resource mapping unit 124, and radio interface 126.

Client device 120 may both send and receive media data, e.g., in the form of audio, video, and/or extended reality (XR) data. Data sent from client device 120 to another device, such as another client device or server device 60 of FIG. 1, is sent via an uplink stream, while data received by client device 120 is received via a downlink stream. In the downlink (DL) extended reality and media (XRM) service stream, UPF 102 may classify incoming data packets based on packet filter sets of the packet detection rule 106. UPF 102 may convey the classification of the user plane traffic belonging to a QoS Flow through a QoS flow identifier (QFI) marking. QoS to AN resource mapping unit 112 of AN 110 binds QoS flows to AN resources (i.e., Data Radio Bearers). For the uplink (UL) XRM service stream, client device 120 (which may be user equipment (UE)) performs similar PDU Set identification procedure as UPF 102. Client device 120 may perform the marking for the identified PDU Set to the AN.

3GPP TR 23.700-60 reports candidate solutions to identify the PDU and PDU Set boundaries by matching RTP/SRTP header, header extension and payload. New parameters such as PDU Set sequence number, PDU Set identifier, and PDU Set type were proposed to identify the PDU and PDU Set. The candidate solutions also proposed to mark the PDU Set priority, dependency or importance by matching the relevant parameters in RTP header extension or payload such as video Network Abstraction Layer (NAL) type, temporal ID (TID), and layer ID (LID). The most important PDU or PDU Set may assign to the QoS Flow with higher QoS requirements, and the less important PDU or PDU Set may be discarded during network congestion or when its dependent PDU or PDU Set is not completely delivered. It was also proposed that AN may discard PDU Set if a number of PDUs of the PDU Set are not received.

A PDU may be mapped to a video data packet. An encoder or application function (AF) may be configured to recognize video data packet properties, such as packet type and dependency, and the identifier of the data packet, such as a picture order counter (POC) value, for a video packet. The identifier is usually embedded within the media data packet and not exposed to the RTP header or header extension. The link between a particular video data packet and the corresponding properties may be lost during the data encapsulation, filtering, and mapping to QoS flow, especially for unordered transmission, as the packer order may be shuffled. Adding fields of attributes or properties of each packet to the RTP header or header extension may increase the overhead cost, because many RTP packet may share the same properties. It may be beneficial to add video data packet identifier to RTP header or header extension as an index to the list of data packet properties.

PDU Sets may also have marked priority values. In some cases, picture type, temporal identifier (TID), or layer identifier (LID) may be used to identify a priority among PDU Sets and mark the PDU Set priority or importance. However, multiple priority implications may add complexity to intermediate devices to derive a final, overall priority. In addition, the encoder may assign the same TID to all frames, and the importance of the frames with the same TID may also vary. It generally makes sense to mark the intra-coded picture as highest priority and the pictures not used for reference as the lowest priority. However, there are cases when a picture is intra-coded but not used for reference as well (e.g., all intra mode). A single indication may be necessary to indicate the picture priority at the codec level for the inspection.

PDU Sets may also have marked dependency information. Picture dependency is managed by reference picture management in most video coding schemes. A reference picture is stored in a decoded picture buffer (DPB) for inter-prediction until it is marked as "unused for reference" and removed from the DPB.

ITU-T H.266/Versatile Video Coding (VVC) specifies two reference picture lists (RPLs), called list0 and list1. The pre-defined candidate RPLs are signaled in the sequence parameter set (SPS). The index referencing a predefined candidate RPL is signaled either in the picture header (PH), if all slices of the picture have the same RPLs, or in Slice header (SH). A new RPL can also be directly signaled in the picture header (PH) and slice header (SH). A reference picture may be a short-term reference picture, a long-term reference picture, or an inter-layer reference picture, and the reference picture is marked using picture order count (POC) and the layer ID if it is used for inter-layer prediction. The reference pictures used for inter-prediction of the current picture are the active reference pictures of the current picture.

ITU-T H.265/High Efficiency Video Coding (HEVC) specifies the reference pictures in the reference picture set (RPS). RPS may be signaled in the sequence parameter set (SPS) or slice header (SH).

ITU-T H.264/Advanced Video Coding (AVC) specifies the reference pictures based on two marking mechanisms: the implicit sliding window process, and the explicit memory management control operation process. Usually up to 16 unique reference pictures are allowed given the decoded picture buffer size.

AOMedia Video 1 (AV1) allows a maximum of 7 reference frames, and the frame marking function is specified in the frame header open bitstream unit (OBU). The reference picture indication may be presented in a frame header OBU or the additional header of each tile.

Due to the different reference picture management designs in different codecs, it is complicated for UPF 102 to derive the dependency for each PDU Set in a codec-agnostic manner. This disclosure recognizes that it would be beneficial to indicate the picture dependency explicitly to support existing codecs at a specific NAL unit or a SEI message.

In addition, reference picture marking is based on the POC value, which represents the picture output order, while the frames or PDU Sets in the bitstream are in encoding order, such that the POC value may not be continuous for the adjacent frames in the bitstream. It is not straightforward to map the POC value to the PDU Set sequence number (SN) with existing schemes.

H.266 supports sub-picture partitioning, in which each sub-picture may be decoded independently from other subpictures within the same frame. A frame may contain mixed intra-coded subpictures and inter-coded subpictures, even though all subpictures may share the same reference pictures. Additional attributes may be needed for the subpicture identification and marking to facilitate the appropriate PDU handling. For example, when subpictures are independently coded and some PDUs of a PDU Set are lost, the remaining PDUs may be continually delivered. When subpictures are not independently coded and some PDUs are lost, the remaining PDUs may be dropped.

AV1 supports a tile list, which contains tile data associated with a frame, and each tile can be independently decoded. The tile list allows the decoder to process a subset of tiles and display corresponding parts of the frame, without the need to fully decode all the tiles in the frame.

Figure 3:
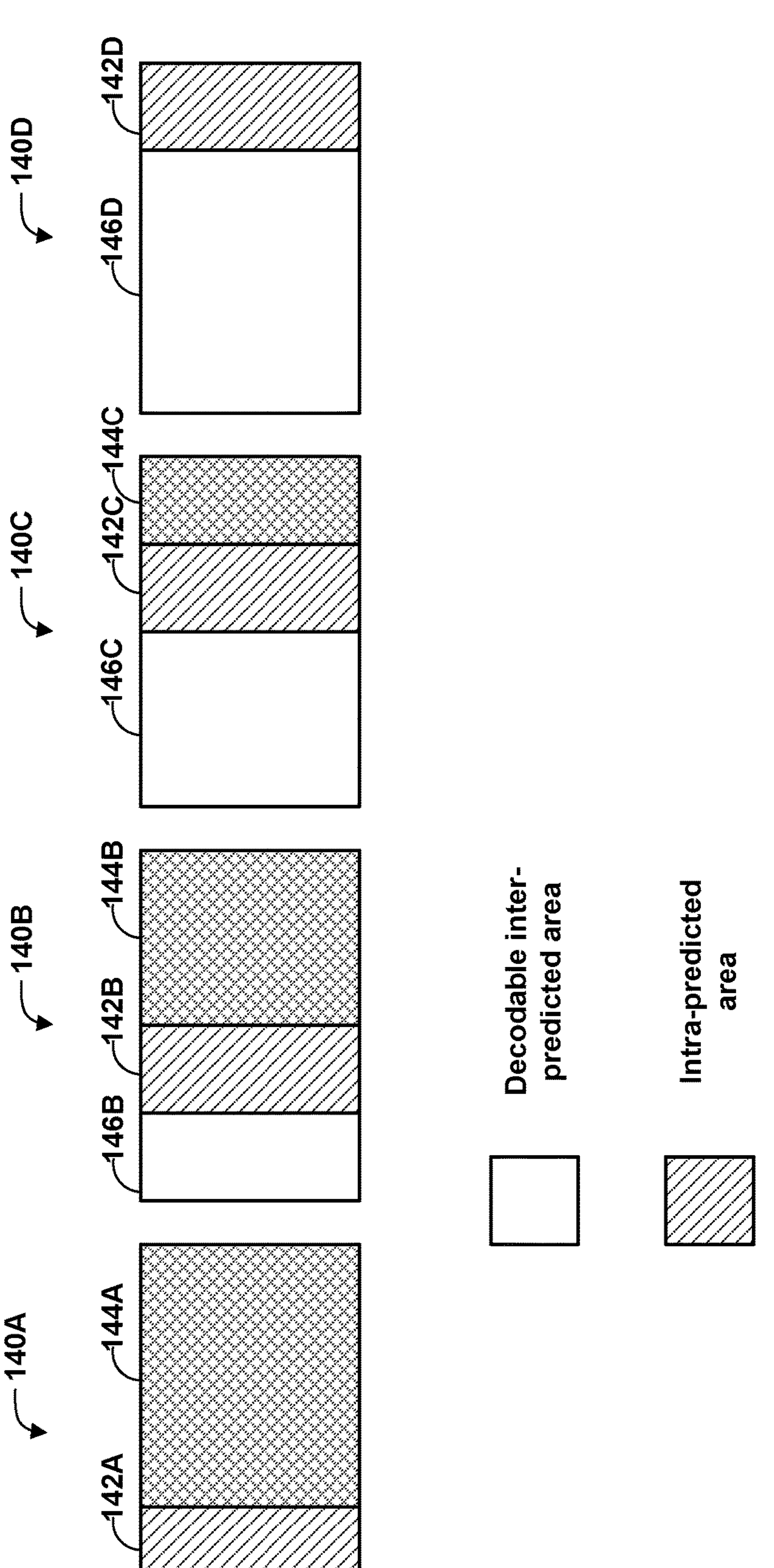
FIG. 3 is a conceptual diagram illustrating a series of gradual decoder refresh (GDR) frames of video data.

FIG. 3 is a conceptual diagram illustrating a series of gradual decoder refresh (GDR) frames of video data. In general, when performing random access (that is, beginning streaming at a point in a video other than the beginning of the video), the stream is accessed starting at a stream access point. Stream access points can be fully intra-prediction encoded, such that the entire frame can be decoded and playback can begin with the stream access point. Such frames may be referred to as instantaneous decoder refresh (IDR) pictures. However, fully intra-prediction encoded frames have relatively high bitrates.

Accordingly, rather than having a single IDR stream access point, gradual decoder refresh (GDR) stream access points may be used. In general, GDR stream access points include a series of frames including portions that are intra-prediction encoded, while other portions are inter-prediction encoded. When performing random access from GDR stream access points, the inter-prediction encoded portions may be decodable or non-decodable, based on which side of the intra-prediction portion the inter-prediction portions occur.

GDR enables encoders to smooth the bit rate of a bitstream by distributing intra-coded slices or blocks in multiple pictures as contrasted with intra coding entire pictures, thus allowing significant end-to-end delay reduction, which is especially important for ultralow-delay applications. When beginning the decoding process with the decoding of a GDR picture, some areas of the picture cannot be correctly decoded, after decoding a number of additional pictures referred to as the recovery period, the entire picture for the recovery point and all subsequent pictures in output order would be correctly decoded. FIG. 3 shows an example of such GDR picture recovery period, where clean areas and intra-predicted areas are areas that can be correctly decoded, and dirty areas are areas cannot be correctly decoded for random access. As a result, the PDUs of the dirty areas that cannot be correctly decoded may be discarded when the random access occurred at the associated GDR picture. The identification and marking of PDUs and PDU Sets of the GDR picture has not been addressed in the candidate solutions.

More particularly, in the example of FIG. 3, GDR frames 140A-140D are shown. GDR frame 140A includes intra-prediction encoded area 142A and non-decodable inter-prediction encoded area 144A. GDR frame 140B includes decodable inter-prediction area 146B, intra-prediction encoded area 142B, and non-decodable inter-prediction encoded area 144B. GDR frame 140C includes decodable inter-prediction area 146C, intra-prediction encoded area 142C, and non-decodable inter-prediction encoded area 144C. GDR frame 140D includes decodable inter-prediction area 146D and intra-prediction encoded area 142D.

Non-decodable inter-prediction encoded areas 144A-144C are not decodable, when performing random access starting from GDR frame 140A, because non-decodable inter-prediction encoded areas 144A-144C may refer to reference frames preceding GDR frame 140A in coding order. Decodable inter-prediction areas 146B-146D are decodable because they can only be predicted from reference frames starting at GDR frame 140A, and only from either decodable inter-prediction areas or intra-prediction areas.

In H.266/VVC, a picture is not output when the PictureOutputFlag is equal to 0. For example, a picture is not output when it is a random access skippable leading (RASL) picture and NoOutputBeforeRecoveryFlag of the associated Intra Random Access Point (IRAP) picture is equal to 1; a picture is not output when it is a Gradual Decoding Refresh (GDR) picture with NoOutputBeforeRecoveryFlag equal to 1 or is a recovering picture of a GDR picture with NoOutputBeforeRecoveryFlag equal to 1; a picture is not output when its ph_pic_output_flag is equal to 0. The value of NoOutputBeforeRecoveryFlag may be set by the external means or by the associated picture position in the bitstream. A PDU Set may be discarded if it is not output and not used as reference for the following picture prediction.

Figure 4:
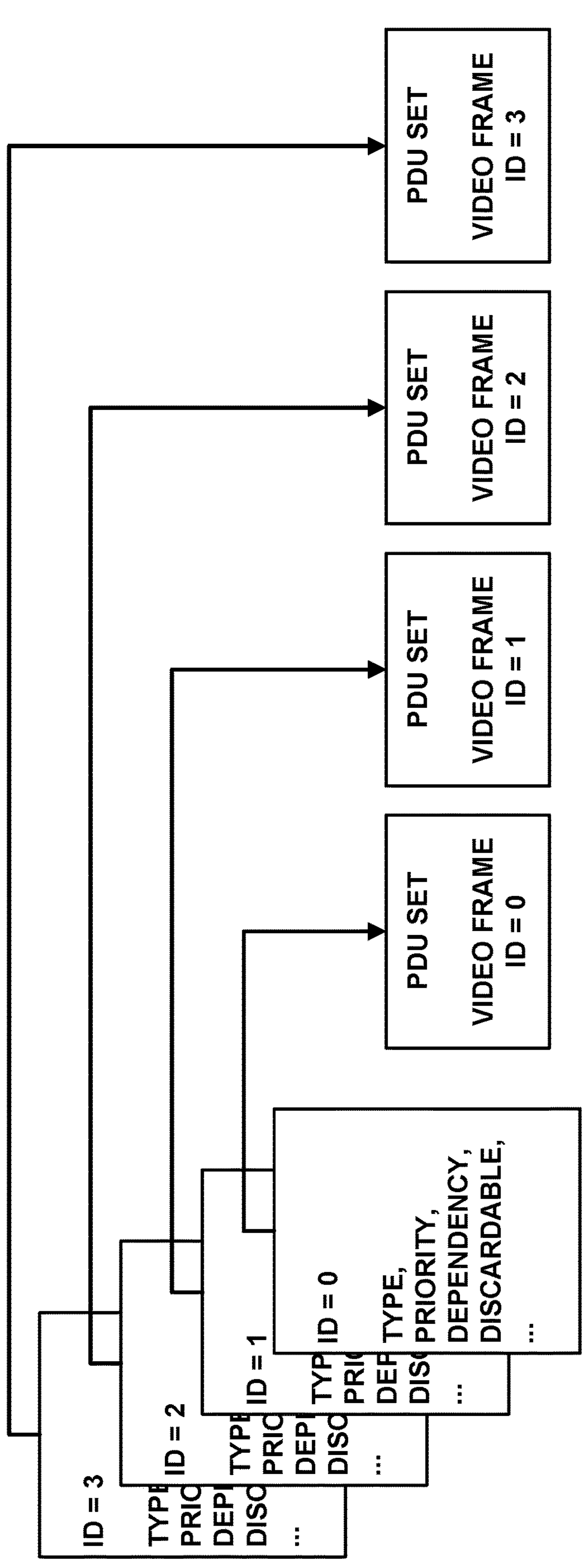
FIG. 4 is a conceptual diagram illustrating example sets of identifying information for protocol data units (PDUs).

FIG. 4 is a conceptual diagram illustrating example sets of identifying information for protocol data units (PDUs). This disclosure describes techniques in which high level syntax designs in video codecs may be used to facilitate PDU and PDU Set identification and marking. The identifier of a video frame (e.g., POC value in AVC/HEVC/VVC, display_frame_id or current_frame_id in AV1) may be added to an RTP header extension and further marked in PDU Sets or PDUs. An application function (AF) may indicate the video frame properties such as frame type, priority, and dependency to UPF 102 (FIG. 2) via a Policy Control Function (PCF) and a Session Management Function (SMF) using the video frame identifier. UPF 102 may classify video packet for QoS marking by inspecting the frame identifier of the data packet and linking it to the corresponding properties for QoS marking. FIG. 4 depicts an example of using a video frame ID as an index to link a PDU Set to a table or list containing the associated video data properties.

In some examples, the slice or tile identifier (e.g., slice segment address in HEVC, slice_address in VVC, tile count in AV1) indicating a specific slice/tile within a frame may be signaled in the RTP header extension, together with the frame identifier. The slice/tile identifier may be mapped to a PDU attribute field. The AF may indicate the video slice/tile properties using both frame identifier and slice/tile identifier to UPF 102. UPF 102 may classify video packets for QoS marking by inspecting the frame identifier and slice/tile identifier of the data packet and linking these values to the corresponding properties for QoS marking.

In some examples, the frame marking RTP header extension may include priority marking information. For example, the frame marking RTP header extension may include data indicating whether a corresponding frame is intra-prediction encoded (an I-frame), a discardable frame (D), a temporal ID (TID) for the frame, and/or a layer ID (LID). Any or all of this data may represent the PDU Set priority marking. Such priority attribute data may be signaled in a network abstraction layer (NAL) unit header, a specific NAL unit, or a supplemental enhancement information (SEI) message for the PDU Set priority marking inspection.

In some examples, a NAL unit priority indication, nuh_priority, may be signaled in the NAL unit header or header extension. The priority indication may be a 3-bit code which specifies the priority of the NAL unit associated, it takes values between 1 and 7, with 1 representing the highest priority and 7, the lowest priority. Table 1 below is an example representing an indication of the NAL unit priority in the NAL unit header extension. In Table 1, "[added: " "]" represents additions relative to existing NAL unit syntax, e.g., of ITU-T H.266, while "[removed: " "]" represents deletions relative to existing NAL unit syntax.

TABLE 1

| | Descriptor |
|---|---|
| nal_unit_header( ) { | |
| forbidden_zero_bit | f(1) |
| [removed: "nuh_reserved_zero_bit"] | u(1) |
| nuh_layer_id | u(6) |
| nal_unit_type | u(5) |
| nuh_temporal_id_plus1 | u(3) |
| [added: "nuh_extention_flag"] | u(1) |
| [added: "if( nuh_extension_flag ) {"] | |
| [added: "nuh_priority"] | u(3) |
| [added: "nuh_reserved_zero_5bits"] | u(5) |
| } | |
| } | |

Semantics for the added syntax elements in the example of Table 1 may be as follows:

nuh_extension_flag equal to 0 specifies that no nuh_priority and muh_reserved_zero_5bits syntax elements are present in the NAL unit header syntax structure. nuh_extension_flag equal to 1 specifies that nuh_priority and muh_reserved_zero_5bits syntax elements might be present in the NAL unit header syntax structure.

nuh_priority specifies the NAL unit priority. nuh_priority equal to 1 represents the highest priority and 7 represents the lowest priority.

As another example, a picture priority indication, aud_priority, may be signaled in the AU delimiter (AUD) as shown in Table 2:

TABLE 2

| | Descriptor |
|---|---|
| access_unit_delimiter_rbsp( ) { | |
| aud_irap_or_gdr_flag | u(1) |
| aud_pic_type | u(3) |
| [added: "aud_priority"] | u(3) |
| rbsp_trailing_bits( ) | |
| } | |

Semantics for the added syntax element in the example of Table 2 may be as follows:

aud_priority specifies the priority of the access unit (AU) containing the AU delimiter, aud_priority equal to 1 represents the highest priority and 7 represents the lowest priority.

As yet another example, the picture priority indication may be signaled in the picture header (PH), as shown in Table 3:

TABLE 3

| | Descriptor |
|---|---|
| picture_header_structure( ) { | |
| ph_gdr_or_irap_pic_flag | u(1) |
| [removed: "ph_non_ref_pic_flag"] | u(1) |
| [added: "ph_priority"] | u(3) |
| if( ph_gdr_or_irap_pic_flag ) | |
| ph_gdr_pic_flag | u(1) |
| ph_inter_slice_allowed_flag | u(1) |

Semantics for the added syntax element in the example of Table 3 may be as follows:

ph_priority specifies the priority of the current picture. ph_priority equal to 1 represents the highest priority and 7 represents the lowest priority. The lowest priority implies the current picture is never used as a reference picture.

In still another example, the picture priority indication may specify the priority among the pictures sharing the same TID and LID of current picture. In that case, the PDU Set priority marking may be derived from ph_priority, TID, and LID.

In some examples, the slice priority indication may be signaled in the slice header (SH) to indicate the priority among slices within the same picture, or slices of the pictures sharing the same TID and LID.

In some examples, the picture or slice priority may be signaled in an SEI message to indicate the picture priority, or slice priority using the slice address.

In some examples, the frame priority indication may be signaled in a specific OBU for AV1 codec, such as Frame header OBU or a metadata OBU. The Tile priority indication may be signaled in Tile group OBU or Tile list OBU. Table 4 is an example of a frame header OBU syntax with frame priority indication:

TABLE 4

| | Type |
|---|---|
| uncompressed_header( ) { | |
| if ( frame_id_numbers_present_flag ) { | |
| —idLen = ( additional_frame_id_length_minus_1 + delta_frame_id_length_minus_2 + 3 ) | |
| } | |
| allFrames = (1 << NUM_REF_FRAMES) − 1 | |
| if ( reduced_still_picture_header ) { | |
| ... | |
| } else { | |
| show_existing_frame | f(1) |
| ... | |
| frame_type | f(2) |
| [added: "frame_priority"] | f(3) |
| ... | |

The frame priority syntax element may be signaled or mapped to other protocols such as RTP header extension or GPRS Tunneling Protocol User Plane (GTP-U) extension header.

Deriving the PDU Set dependency from the reference picture lists is generally quite complicated. Likewise, there is an additional cost required to map the POC value to the PDU Set sequence number (SN). Thus, according to the techniques of this disclosure, the distance (e.g., POC distance) between the current picture and the active reference picture in the bitstream may be marked in a specific NAL unit or an SEI message. All active reference pictures precede the current picture in the bitstream. Depending on the PDU Set boundary, the distance may be in the unit of access unit (AU) or picture unit (PU).

Table 5 below is an example syntax structure that indicates the active reference picture list in the bitstream relevant to the current picture. The list includes short-term active reference pictures, long-term active reference pictures, and inter-layer active reference pictures.

TABLE 5

| | Descriptor |
|---|---|
| act_ref_pic_list_struct( ) { | |
| num_st_act_ref_pos | u(8) |
| for( i = 0; i < num_st_act_ref_pos; i++) { | |
| st_act_ref_delta_pos [ i ] | u(16) |
| } | |
| num_lt_act_ref_pos | u(8) |
| for( i = 0; i < num_lt_act_ref_pos; i++) { | |
| lt_act_ref_delta_pos [ i ] | u(32) |
| } | |
| num_il_act_ref_pos | u(8) |
| for( i = 0; i < num_il_act_ref_pos; i++) { | |
| il_act_ref_delta_pos [ i ] | u(8) |
| } | |
| } | |

Semantics for the syntax elements in the example of Table 5 may be as follows:

num_st_act_ref_pos specifies the number of short term active reference picture positions in the syntax structure.

st_act_ref_delta_pos specifies the distance between current picture and the active short term reference picture in units of access unit (AU).

For single layer bitstream, an AU contains a picture. Assuming the sequence number (SN) of current PDU Set is N, the SN of the PDU Set containing the i-th short term active reference picture is (N−st_act_ref_delta_pos[i]).

In another example, st_act_ref_delta_pos may specify the distance between the current PU and the active short term reference picture in units of picture.

num_lt_act_ref_pos specifies the number of long term active reference picture positions in the syntax structure.

it_act_ref_delta_pos specifies the distance between current picture and the active short term reference picture in units of AU.

For single layer bitstream, an AU contains a picture. Assuming the SN of current picture or PDU Set is N, the SN of the PDU Set containing the i-th long term active reference picture is (N−st_act_ref_delta_pos[i]).

In some examples, lt_act_ref_delta_pos may specify the distance between the current picture and active long term reference picture in units of picture.

num_il_act_ref_pos specifies the number of inter-layer active reference picture positions in the syntax structure.

it_act_ref_delta_pos specifies the layer difference between current picture and the active inter-layer reference picture.

Assuming the SN of current picture or PDU Set is N and each PDU Set contains a picture, the SN of the PDU Set containing the i-th inter-layer active reference picture is (N−il_act_ref_delta_pos[i]).

In some examples, the data length of st_act_ref_delta_pos, it_act_ref_delta_pos and il_act_ref_delta_pos may be extended to accomondate the number of layers when each PDU Set contains a picture instead of an AU.

Table 6 below depicts an example of a simplified active reference picture list structure:

TABLE 6

| | Descriptor |
|---|---|
| act_ref_pic_list_struct( ) { | |
| num_act_ref_pos | u(8) |
| for( i = 0; i < num_st_act_ref_pos; i++) { | |
| act_ref_delta_pos [ i ] | u(32) |
| } | |
| num_il_act_ref_pos | u(8) |
| for( i = 0; i < num_il_act_ref_pos; i++) { | |
| il_act_ref_delta_pos [ i ] | u(8) |
| } | |
| } | |

Semantics for the syntax elements of the example of Table 6 may be as follows:

num_act_ref_pos specifies the number of active reference picture positions in the syntax structure.

act_ref_delta_pos specifies the distance between current picture and the active reference picture in units of access unit (AU). Assuming the SN of PDU Set is N, the SN of the PDU Set containing the i-th active reference picture is (N−act_ref_delta_pos[i]).

num_il_act_ref_pos specifies the number of inter-layer active reference picture positions in the syntax structure.

Il_act_ref_delta_pos specifies the distance between current picture and the active reference picture in units of picture unit (PU). Assuming the SN of PDU Set is N, the SN of the PDU Set containing the i-th inter-layer active reference picture is (N−il_act_ref_delta_pos[i]).

The proposed active reference picture position syntax structure may be carried in the AU delimiter (AUD) or an SEI message.

In some examples, the reference picture distance in the above syntax structure may be replaced by a sequence number indicating the AU or PU position in the bitstream. Such a sequence number increases by one for every new AU or PU added to the bitstream. The sequence number may map to PDU Set sequence number to facilitate the derivation of the frame dependency.

In some examples, the position of the reference pictures in the decoding order may be signaled in a specific metadata type OBU (e.g., metadata_itut_t35) or a new metadata type OBU in AV1 to indicate the dependency of current picture in the bitstream.

In some examples, the proposed active reference picture list syntax elements may be signaled or mapped to other protocols such as RTP or GTP-U extended header.

In some examples, the active reference picture list struct may be carried in an active reference picture position list SEI message. A persistence flag is proposed in the SEI message to indicate if the active reference picture list applicable to current picture only, or applicable to current picture and all subsequent pictures of the current layer. The persistence may be cancelled when a proposed cancel flag is set or a new coded layer video sequence (CLVS) of current layer begins.

An independent PDU marking may be signaled to indicate whether a current PDU can be decoded without other PDUs of the same PDU Set. An independent PDU may be transported even though other PDUs in the same PDU Set are lost. An independent PDU can be a slice including an independent sub-picture, or a slice consisting of a motion constrained tile set (MCTS) in a H265 bitstream.

In some examples, a syntax element may be signaled in a specific video codec NAL unit to indicate all slices boundaries in the CLVS (when signaled in SPS) or the associated picture (when signaled in PPS, PH, or AUD) are treated as picture boundaries and there is no loop filtering across the slice boundaries. Each slice can be independently decoded without involving other slice samples in the same picture.

In some examples, a syntax element may be signaled in a slice header (SH) to indicate whether a current slice can be independently decoded without prediction from other samples within the same frame.

marking when NoOutputBeforeRecoveryFlag of the associated TRAP picture is equal to 1.

Since it is not straightforward to detect a discardable picture, a syntax element may be signaled to indicate whether the associated picture may be discarded for transport or decoding in a specific NAL unit such as AUD, PH or SH, or an SEI message.

For a VVC bitstream, a RASL picture with pps_mixed_nalu_types in_pic flag equal to 1 may contain both one or more RASL subpictures and one or more random access decodable leading (RADL) subpictures. The RADL subpicture may be used as an active reference subpicture, which should not be discarded. While the RASL subpicture or slices of the RASL picture can be discarded, the associated PDU may be marked as a discardable PDU.

For a VVC bitstream, when a GDR picture with NoOutputBeforeRecoveryFlag equal to 1, or a recovering picture of a GDR picture with NoOutputBeforeRecoveryFlag equal to 1, the slices of the GDR pictures that cannot be correctly decoded may be discarded. The corresponding slices that cannot be correctly decoded may be marked in an RTP header extension so that UPF 102 may discard the associated PDUs during times of congestion.

For VVC, the picture header syntax element, ph_non_ref_pic_flag, indicates the current picture is never used as a reference picture. Such a syntax element can be used for discardable marking. For the AV1 codec, a discardable or non-reference indication may be signaled in a Frame header OBU uncompressed header or a tile group OBU to indicate whether the associated frame is not used as reference picture for the following pictures and may be discarded without impacting the decoding process. Table 7 below is an example of such a frame header OBU uncompressed header syntax with a discardable frame indication, indicated by the tag: "[added: " "]."

TABLE 7

| | Type |
|---|---|
| uncompressed_header( ) { | |
| if ( frame_id_numbers_present_flag ) { | |
| —idLen = ( additional_frame_id_length_minus_1 + delta_frame_id_length_minus_2 + 3 ) | |
| } | |
| allFrames = (1 << NUM_REF_FRAMES) − 1 | |
| if ( reduced_still_picture_header ) { | |
| ... | |
| } else { | |
| show_existing_frame | f(1) |
| ... | |
| frame_type | f(2) |
| FrameIsIntra = (frame_type == INTRA_ONLY_FRAME \|\| frame_type == KEY_FRAME) | |
| ... | |
| [added: "if ( !FrameIsIntra )"] | |
| [added: "frame_discardable"] | f(1) |
| ... | |

Since each tile in AV1 can be independently decoded, the independent PDU marking may be set for each PDU in case a PDU is an AV1 tile, and a tile list OBU is present.

For an HEVC bitstream, a PDU Set of a random access skippable leading (RASL) picture may be marked as a discard picture in the frame marking or PDU Set marking when NoRaslOutputFlag of an associated intra random access point (IRAP) picture is equal to 1.

For a VVC bitstream, a PDU Set of a RASL picture with pps_mixed_nalu types_in_pic_flag equal to 0 may be marked as a discard picture in the frame marking or PDU Set Since the discard of a slice or frame may be determined on-the-fly, an indicator may be signaled in an SEI message or a re-writable field of a specific NAL unit, or a metadata type OBU, to indicate whether the associated NAL unit can be discarded or not.

In some examples, a slice may be marked as a discardable slice when any of the following conditions is true: the current picture is a RASL picture and the current slice NAL unit type is RASL; the current picture is a GDR picture and the current slice is a P or B slice (uni-directional inter-predicted or bi-directional inter-predicted); or the current picture is a recovering picture of the GDR picture and the current slice is a P or B slice following a preceding I slice in the same picture.

Figure 5:
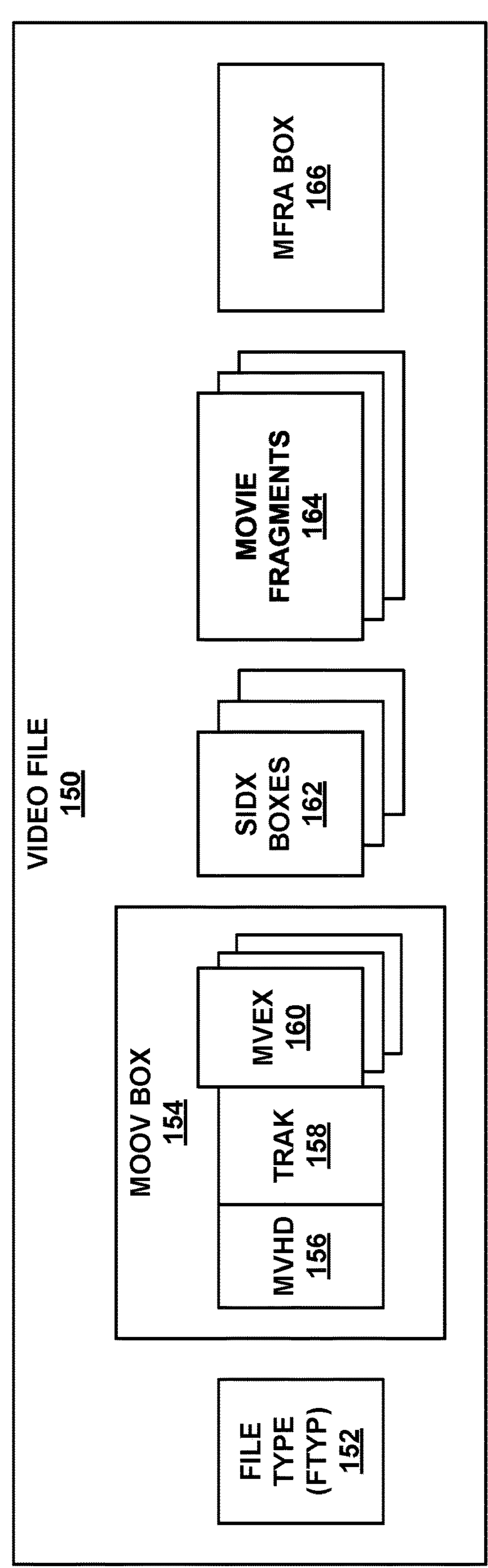
FIG. 5 is a block diagram illustrating elements of an example video file.

FIG. 5 is a block diagram illustrating elements of an example video file 150. As described above, video files in accordance with the ISO base media file format and extensions thereof store data in a series of objects, referred to as "boxes." In the example of FIG. 5, video file 150 includes file type (FTYP) box 152, movie (MOOV) box 154, segment index (sidx) boxes 162, movie fragment (MOOF) boxes 164, and movie fragment random access (MFRA) box 166. Although FIG. 5 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

MOOV box 154, in the example of FIG. 5, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 1) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 5). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 6:
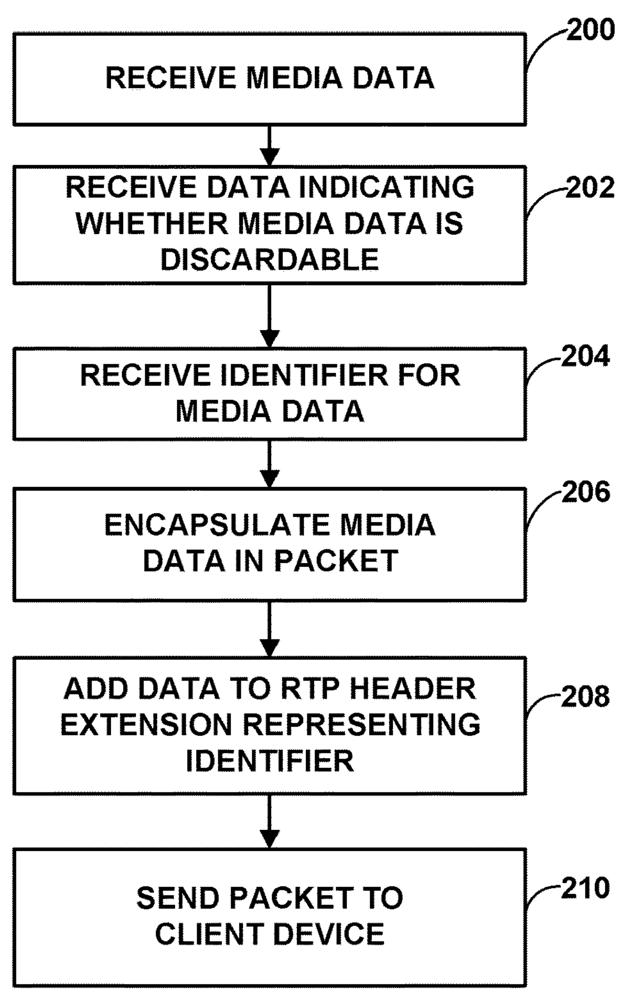
FIG. 6 is a flowchart illustrating an example method including sending a packet including media data according to the techniques of this disclosure.

FIG. 6 is a flowchart illustrating an example method including sending a packet including media data according to the techniques of this disclosure. Initially, a server device, such as server device 60 of FIG. 1, may receive media data (200), e.g., from content preparation device 20 (FIG. 1). The media data may be encapsulated media data or encoded media data. The media data may include at least a portion of a frame/picture of video data, e.g., a slice or tile.

Server device 60 may also receive data indicating whether the media data is discardable (202) and an identifier for the media data (204). The identifier may be, for example, a frame number, picture order count (POC) value, and/or other such identifier. The identifier may further indicate, for example, a temporal identifier (TID), layer identifier (LID), or the like. The identifier may also indicate a particular slice, tile, or other portion of a frame or picture that the media data represents.

Server device 60 may then encapsulate the media data into a packet (206). Alternatively, the media data as received may already be encapsulated in a network packet, in some examples. In any case, according to the method of FIG. 6, server device 60 may add data to an RTP header extension of the packet representing the identifier (208). The identifier itself may indicate whether the media data of the packet is discardable, or server device 60 may further add data to the RTP header extension indicating whether the media data of the packet is discardable. For example, the media data may be discardable if the media data is predicted from reference media data that was not transmitted to the client device, e.g., because the reference media data precedes a random access point accessed by the client device. Server device 60 may then send the packet to the client device.

Figure 7:
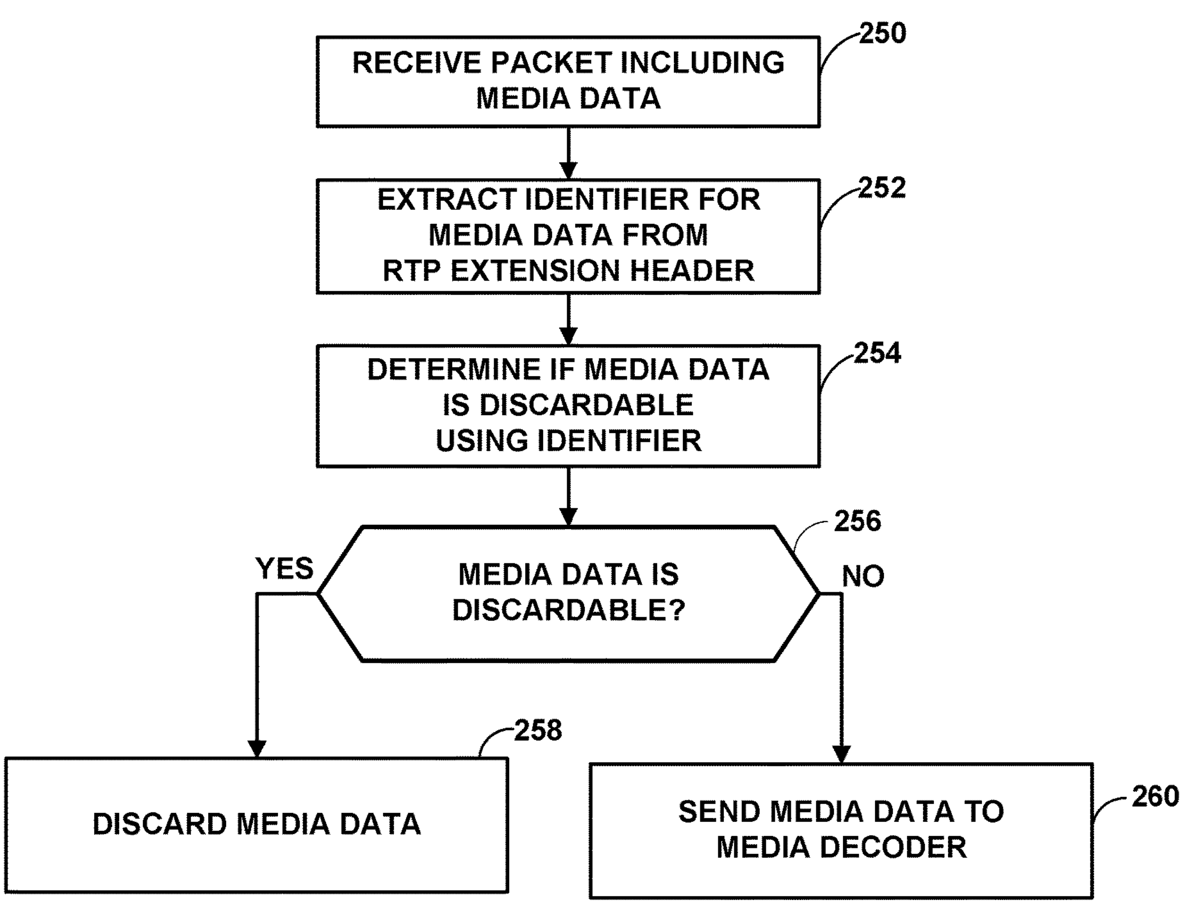
FIG. 7 is a flowchart illustrating an example method including receiving a packet including media data according to the techniques of this disclosure.

FIG. 7 is a flowchart illustrating an example method including receiving a packet including media data according to the techniques of this disclosure. In this example, client device 40 of FIG. 1, for example, may initially receive a packet including media data (250). That is, the packet may include a packet header and a payload, separate from the packet. The payload may correspond to the application layer data of the packet, e.g., media data formatted according to the ISO Base Media File Format, as explained above with respect to FIG. 5. For example, the payload may include XR data, audio data, and/or video data of a PDU Set.

The packet header may include an RTP header extension according to the techniques of this disclosure. Thus, the RTP header extension may include, among other data, an identifier for the media data of the packet. Client device 40 may extract the identifier for the media data from the RTP header extension (252). Client device 40 may then determine whether the media data is discardable using the identifier (254). For example, client device 40 may determine that the identifier includes a POC value for a picture of the media data, a slice or tile identifier for the picture, a TID, and/or a LID for the picture. Client device 40 may further determine whether a bitstream including the media data was randomly accessed from a stream access point other than the beginning of the bitstream. If the bitstream was randomly accesses, client device 40 may further determine whether the stream access point follows one or more reference pictures for the media data of the packet, such that the reference pictures would not have been received. If the reference pictures have not been received, client device 40 may determine that the media data is discardable.

In response to determining that the media data is discardable ("YES" branch of 256), client device 40 may discard the media data (258) without sending the media data to, e.g., video decoder 48 (FIG. 1). In response to determining that the media data is not discardable ("NO" branch of 256), client device 40 may forward the media data to video decoder 48 (260).

While explained with respect to client device 40 of FIG. 1, the method of FIG. 7 may also be performed by, e.g., client device 120 of FIG. 2. Likewise, a similar method may be performed by UPF 102 of FIG. 2. In the example in which UPF 102 or another device performs the method of FIG. 7, when media data is sent to a video decoder, it may be assumed that the video decoder forms part of client device 120, such that sending the media data to the video decoder includes sending the packet to client device 120.

In this manner, the method of FIG. 7 represents an example of a method including receiving a packet including a packet header and a payload including at least a portion of a frame of video data, the packet header being separate from the payload; extracting, from the packet header, a video frame identifier for the frame of video data; and processing the payload according to the video frame identifier.

Various examples of the techniques of this disclosure are summarized in the following clauses:

Clause 1: A method of receiving video data, the method comprising: receiving a packet including a packet header and a payload including at least a portion of a frame of video data, the packet header being separate from the payload; extracting, from the packet header, a video frame identifier for the frame of video data; and processing the payload according to the video frame identifier.

Clause 2: The method of clause 1, wherein the video frame identifier comprises a picture order count (POC) value.

Clause 3: The method of clause 1, wherein the video frame identifier comprises a display frame identifier or a current frame identifier.

Clause 4: The method of any of clauses 1-3, wherein the at least portion of the frame comprises a slice of the frame, and wherein the video frame identifier includes a slice identifier for the slice.

Clause 5: The method of any of clauses 1-4, wherein the at least portion of the frame comprises a tile of the frame, and wherein the video frame identifier includes a tile identifier for the slice.

Clause 6: The method of any of clauses 1-5, further comprising determining, using the video frame identifier, one or more of a frame type for the frame, a priority for the frame, or dependency information for the frame.

Clause 7: The method of any of clauses 1-6, wherein the at least portion of the frame of video data comprises a protocol data unit (PDU) of a PDU Set.

Clause 8: The method of any of clauses 1-7, further comprising extracting, from the packet header, one or more of a network abstraction layer (NAL) unit type for the at least portion of the frame, a temporal identifier (TID) for the at least portion of the frame, a layer identifier (LID) for the at least portion of the frame, data indicating whether the at least portion of the frame is intra-prediction coded, or data indicating whether the at least portion is discardable.

Clause 9: The method of any of clauses 1-8, further comprising processing a network abstraction layer (NAL) unit header for the frame, the NAL unit header including data indicating a priority value for the frame.

Clause 10: The method of any of clauses 1-9, further comprising processing an access unit delimiter (AUD) for an access unit corresponding to the frame, the AUD including data representing a priority value for the access unit.

Clause 11: The method of any of clauses 1-10, further comprising processing a picture header for the frame, the picture header including data representing a priority value for the frame.

Clause 12: The method of any of clauses 1-8, further comprising processing an open bitstream unit (OBU) for the at least portion of the frame, the OBU including data representing a priority value for the at least portion of the frame.

Clause 13: The method of clause 12, wherein the OBU comprises one of a frame header OBU or a metadata OBU.

Clause 14: The method of any of clauses 1-13, further comprising receiving data indicating a picture distance between the frame and a reference frame in coding order for the frame.

Clause 15: The method of clause 14, wherein receiving the data indicating the picture distance comprises receiving a network abstraction layer (NAL) unit including the data or a supplemental enhancement information (SEI) message including the data.

Clause 16: The method of any of clauses 14 and 15, wherein receiving the data indicating the picture distance between the frame and the reference frame for the frame comprises receiving data indicating picture distances between the frame and each active reference frame in coding order.

Clause 17: The method of any of clauses 1-16, further comprising receiving information indicating whether the portion of the frame of video data can be decoded without other portions of the frame.

Clause 18: The method of clause 17, wherein the portion of the frame comprises a protocol data unit (PDU), wherein the frame corresponds to a PDU Set including the PDU, and wherein the information indicates whether the PDU can be decoded without other PDUs of the PDU Set.

Clause 19: The method of any of clauses 1-18, further comprising receiving information indicating whether loop filtering is to be performed across one or more boundaries between the portion of the frame and one or more other portions of the frame.

Clause 20: The method of any of clauses 1-19, further comprising receiving information indicating whether the portion of the frame is independently coded without prediction from other portions of the frame.

Clause 21: The method of any of clauses 1-20, further comprising receiving data indicating that the frame is a discardable frame.

Clause 22: The method of clause 21, wherein receiving the data indicating that the frame is the discardable frame comprises receiving the frame in a network abstraction layer (NAL) unit, an access unit delimiter, a picture header, a slice header, a supplemental enhancement information (SEI) message, or a frame header open bitstream unit (OBU).

Clause 23: The method of any of clauses 1-22, wherein processing the payload comprises: determining that the frame is a gradual decoder refresh (GDR) frame and that the at least portion of the frame is independently coded; and in response to determining that the at least portion of the frame is independently coded, providing the at least portion of the frame to a video decoder.

Clause 24: The method of any of clauses 1-22, wherein processing the payload comprises: determining that the frame is a gradual decoder refresh (GDR) frame and that the at least portion of the frame is coded relative to a reference frame; determining that the GDR frame is an ordinal first frame retrieved for a bitstream including the video data such that the reference frame has not been retrieved; and in response to the reference frame having not been retrieved, discarding the at least portion of the video frame.

Clause 25: A device for retrieving media data, the device comprising one or more means for performing the method of any of clauses 1-24.

Clause 26: The device of clause 25, wherein the one or more means comprise one or more processors implemented in circuitry.

Clause 27: The device of clause 25, further comprising a memory configured to store video data.

Clause 28: The apparatus of clause 25, wherein the apparatus comprises at least one of: an integrated circuit; a microprocessor; and a wireless communication device.

Clause 29: A device for receiving media data, the device comprising: means for receiving a packet including a packet header and a payload including at least a portion of a frame of video data, the packet header being separate from the payload; means for extracting, from the packet header, a video frame identifier for the frame of video data; and means for processing the payload according to the video frame identifier.

Clause 30: A method of receiving video data, the method comprising: receiving a packet including a packet header and a payload including at least a portion of a frame of video data, the packet header being separate from the payload; extracting, from the packet header, a video frame identifier for the frame of video data; and processing the payload according to the video frame identifier.

Clause 31: The method of clause 30, wherein the video frame identifier comprises a picture order count (POC) value.

Clause 32: The method of clause 30, wherein the video frame identifier comprises a display frame identifier or a current frame identifier.

Clause 33: The method of clause 30, wherein the at least portion of the frame comprises a slice of the frame, and wherein the video frame identifier includes a slice identifier for the slice.

Clause 34: The method of clause 30, wherein the at least portion of the frame comprises a tile of the frame, and wherein the video frame identifier includes a tile identifier for the slice.

Clause 35: The method of clause 30, further comprising determining, using the video frame identifier, one or more of a frame type for the frame, a priority for the frame, or dependency information for the frame.

Clause 36: The method of clause 30, wherein the at least portion of the frame of video data comprises a protocol data unit (PDU) of a PDU Set.

Clause 37: The method of clause 30, further comprising extracting, from the packet header, one or more of a network abstraction layer (NAL) unit type for the at least portion of the frame, a temporal identifier (TID) for the at least portion of the frame, a layer identifier (LID) for the at least portion of the frame, data indicating whether the at least portion of the frame is intra-prediction coded, or data indicating whether the at least portion is discardable.

Clause 38: The method of clause 30, further comprising processing a network abstraction layer (NAL) unit header for the frame, the NAL unit header including data indicating a priority value for the frame.

Clause 39: The method of clause 30, further comprising processing an access unit delimiter (AUD) for an access unit corresponding to the frame, the AUD including data representing a priority value for the access unit.

Clause 40: The method of clause 30, further comprising processing a picture header for the frame, the picture header including data representing a priority value for the frame.

Clause 41: The method of clause 30, further comprising processing an open bitstream unit (OBU) for the at least portion of the frame, the OBU including data representing a priority value for the at least portion of the frame.

Clause 42: The method of clause 41, wherein the OBU comprises one of a frame header OBU or a metadata OBU.

Clause 43: The method of clause 30, further comprising receiving data indicating a picture distance between the frame and a reference frame for the frame.

Clause 44: The method of clause 43, wherein receiving the data indicating the picture distance comprises receiving a network abstraction layer (NAL) unit including the data or a supplemental enhancement information (SEI) message including the data.

Clause 45: The method of clause 43, wherein receiving the data indicating the picture distance between the frame and the reference frame for the frame comprises receiving data indicating picture distances between the frame and each active reference frame.

Clause 46: The method of clause 30, further comprising receiving information indicating whether the portion of the frame of video data can be decoded without other portions of the frame.

Clause 47: The method of clause 46, wherein the portion of the frame comprises a protocol data unit (PDU), wherein the frame corresponds to a PDU Set including the PDU, and wherein the information indicates whether the PDU can be decoded without other PDUs of the PDU Set.

Clause 48: The method of clause 30, further comprising receiving information indicating whether loop filtering is to be performed across one or more boundaries between the portion of the frame and one or more other portions of the frame.

Clause 49: The method of clause 30, further comprising receiving information indicating whether the portion of the frame is independently coded without prediction from other portions of the frame.

Clause 50: The method of clause 30, further comprising receiving data indicating that the frame is a discardable frame.

Clause 51: The method of clause 50, wherein receiving the data indicating that the frame is the discardable frame comprises receiving the frame in a network abstraction layer (NAL) unit, an access unit delimiter, a picture header, a slice header, a supplemental enhancement information (SEI) message, or a frame header open bitstream unit (OBU).

Clause 52: The method of clause 30, wherein processing the payload comprises: determining that the frame is a gradual decoder refresh (GDR) frame and that the at least portion of the frame is independently coded; and in response to determining that the at least portion of the frame is independently coded, providing the at least portion of the frame to a video decoder.

Clause 53: The method of clause 30, wherein processing the payload comprises: determining that the frame is a gradual decoder refresh (GDR) frame and that the at least portion of the frame is coded relative to a reference frame; determining that the GDR frame is an ordinal first frame retrieved for a bitstream including the video data such that the reference frame has not been retrieved; and in response to the reference frame having not been retrieved, discarding the at least portion of the video frame.

Clause 54: A method of receiving video data, the method comprising: receiving a packet including a packet header and a payload including at least a portion of a frame of video data, the packet header being separate from the payload; extracting, from the packet header, a video frame identifier for the frame of video data; and processing the payload according to the video frame identifier.

Clause 55: The method of clause 54, wherein the video frame identifier comprises a picture order count (POC) value.

Clause 56: The method of clause 54, wherein the video frame identifier comprises a display frame identifier or a current frame identifier.

Clause 57: The method of clause 54, wherein the at least portion of the frame comprises a slice of the frame, and wherein the video frame identifier includes a slice identifier for the slice.

Clause 58: The method of clause 54, wherein the at least portion of the frame comprises a tile of the frame, and wherein the video frame identifier includes a tile identifier for the tile.

Clause 59: The method of clause 54, further comprising determining, using the video frame identifier, one or more of a frame type for the frame, a priority for the frame, or dependency information for the frame.

Clause 60: The method of clause 54, wherein the at least portion of the frame of video data comprises a protocol data unit (PDU) of a PDU Set.

Clause 61: The method of clause 54, further comprising extracting, from the packet header, one or more of a network abstraction layer (NAL) unit type for the at least portion of the frame, a temporal identifier (TID) for the at least portion of the frame, a layer identifier (LID) for the at least portion of the frame, data indicating whether the at least portion of the frame is intra-prediction coded, or data indicating whether the at least portion is discardable.

Clause 62: The method of clause 54, further comprising processing a network abstraction layer (NAL) unit header for the frame, the NAL unit header including data indicating a priority value for the frame.

Clause 63: The method of clause 54, further comprising processing an access unit delimiter (AUD) for an access unit corresponding to the frame, the AUD including data representing a priority value for the access unit.

Clause 64: The method of clause 54, further comprising processing a picture header for the frame, the picture header including data representing a priority value for the frame.

Clause 65: The method of clause 54, further comprising processing an open bitstream unit (OBU) for the at least portion of the frame, the OBU including data representing a priority value for the at least portion of the frame.

Clause 66: The method of clause 65, wherein the OBU comprises one of a frame header OBU or a metadata OBU.

Clause 67: The method of clause 54, further comprising receiving data indicating a picture distance between the frame and a reference frame for the frame.

Clause 68: The method of clause 67, wherein receiving the data indicating the picture distance comprises receiving a network abstraction layer (NAL) unit including the data or a supplemental enhancement information (SEI) message including the data.

Clause 69: The method of clause 67, wherein receiving the data indicating the picture distance between the frame and the reference frame for the frame comprises receiving data indicating picture distances between the frame and each active reference frame.

Clause 70: The method of clause 54, further comprising receiving information indicating whether the portion of the frame of video data can be decoded without other portions of the frame.

Clause 71: The method of clause 70, wherein the portion of the frame comprises a protocol data unit (PDU), wherein the frame corresponds to a PDU Set including the PDU, and wherein the information indicates whether the PDU can be decoded without other PDUs of the PDU Set.

Clause 72: The method of clause 54, further comprising receiving information indicating whether loop filtering is to be performed across one or more boundaries between the portion of the frame and one or more other portions of the frame.

Clause 73: The method of clause 54, further comprising receiving information indicating whether the portion of the frame is independently coded without prediction from other portions of the frame.

Clause 74: The method of clause 54, further comprising receiving data indicating that the frame is a discardable frame.

Clause 75: The method of clause 74, wherein receiving the data indicating that the frame is the discardable frame comprises receiving the frame in a network abstraction layer (NAL) unit, an access unit delimiter, a picture header, a slice header, a supplemental enhancement information (SEI) message, or a frame header open bitstream unit (OBU).

Clause 76: The method of clause 54, wherein processing the payload comprises: determining that the frame is a gradual decoder refresh (GDR) frame and that the at least portion of the frame is independently coded; and in response to determining that the at least portion of the frame is independently coded, providing the at least portion of the frame to a video decoder.

Clause 77: The method of clause 54, wherein processing the payload comprises: determining that the frame is a gradual decoder refresh (GDR) frame and that the at least portion of the frame is coded relative to a reference frame; determining that the GDR frame is an ordinal first frame retrieved for a bitstream including the video data such that the reference frame has not been retrieved; and in response to the reference frame having not been retrieved, discarding the at least portion of the video frame.

Clause 78: A device for retrieving media data, the device comprising: a memory; and a processing system comprising one or more processors implemented in circuitry, the processing system being configured to: receive a packet including a packet header and a payload including at least a portion of a frame of video data, the packet header being separate from the payload; extract, from the packet header, a video frame identifier for the frame of video data; and process the payload according to the video frame identifier.

Clause 79: The device of clause 78, wherein the video frame identifier comprises at least one of a picture order count (POC) value, a display frame identifier, or a current frame identifier.

Clause 80: The device of clause 78, wherein the at least portion of the frame comprises a slice of the frame or a tile of the frame, and wherein the video frame identifier includes an identifier for the slice of the frame or the tile of the frame.

Clause 81: The device of clause 78, wherein the processing system is configured to determine, using the video frame identifier, one or more of a frame type for the frame, a priority for the frame, or dependency information for the frame.

Clause 82: The device of clause 78, wherein the at least portion of the frame of video data comprises a protocol data unit (PDU) of a PDU Set.

Clause 83: The device of clause 78, wherein the processing system is further configured to extract, from the packet header, one or more of a network abstraction layer (NAL) unit type for the at least portion of the frame, a temporal identifier (TID) for the at least portion of the frame, a layer identifier (LID) for the at least portion of the frame, data indicating whether the at least portion of the frame is intra-prediction coded, or data indicating whether the at least portion is discardable.

Clause 84: The device of clause 78, wherein the processing system is further configured to process a network abstraction layer (NAL) unit header for the frame, the NAL unit header including data indicating a priority value for the frame.

Clause 85: The device of clause 78, wherein the processing system is further configured to process an access unit delimiter (AUD) for an access unit corresponding to the frame, the AUD including data representing a priority value for the access unit.

Clause 86: The device of clause 78, wherein the processing system is further configured to process a picture header for the frame, the picture header including data representing a priority value for the frame.

Clause 87: The device of clause 78, wherein the processing system is further configured to process an open bitstream unit (OBU) for the at least portion of the frame, the OBU including data representing a priority value for the at least portion of the frame.

Clause 88: The device of clause 78, wherein the processing system is further configured to receive data indicating a picture distance between the frame and a reference frame for the frame, the data being included in a network abstraction layer (NAL) unit or a supplemental enhancement information (SEI) message.

Clause 89: The device of clause 78, wherein the processing system is further configured to receive information indicating whether the portion of the frame of video data can be decoded without other portions of the frame.

Clause 90: The device of clause 78, wherein the processing system is further configured to receive information indicating whether loop filtering is to be performed across one or more boundaries between the portion of the frame and one or more other portions of the frame.

Clause 91: The device of clause 78, wherein to process the payload, the processing system is configured to: determine that the frame is a gradual decoder refresh (GDR) frame and that the at least portion of the frame is independently coded;

and in response to determining that the at least portion of the frame is independently coded, provide the at least portion of the frame to a video decoder.

Clause 92: The device of clause 78, wherein to process the payload, the processing system is configured to: determine that the frame is a gradual decoder refresh (GDR) frame and that the at least portion of the frame is coded relative to a reference frame; determine that the GDR frame is an ordinal first frame retrieved for a bitstream including the video data such that the reference frame has not been retrieved; and in response to the reference frame having not been retrieved, discard the at least portion of the video frame.

Clause 93: A device for receiving video data, the device comprising: means for receiving a packet including a packet header and a payload including at least a portion of a frame of video data, the packet header being separate from the payload; means for extracting, from the packet header, a video frame identifier for the frame of video data; and means for processing the payload according to the video frame identifier.

Clause 94: A computer-readable storage medium having stored thereon instructions that, when executed, cause a processor to: receive a packet including a packet header and a payload including at least a portion of a frame of video data, the packet header being separate from the payload; extract, from the packet header, a video frame identifier for the frame of video data; and process the payload according to the video frame identifier.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of transporting video data, the method comprising:

receiving, by a network device between a source device and a destination device, a first real-time transport protocol (RTP) packet from the source device destined for the destination device, the first RTP packet including a first RTP packet header and a first payload including at least a first portion of a frame of video data, the first RTP packet header being separate from the first payload, the first RTP packet header further including a first RTP header extension, the at least first portion of the frame corresponding to a first protocol data unit (PDU), the frame of video data corresponding to a protocol data unit (PDU) Set including the first PDU;

extracting, by the network device and from the first RTP header extension, a video frame identifier for the at least first portion of the frame of video data, the video frame identifier indicating a display order value for the at least first portion of the frame;

receiving, by the network device, a second RTP packet from the source device destined for the destination device, the second RTP packet including a second RTP packet header and a second payload including at least a second portion of the frame of video data, the second RTP packet header being separate from the second payload, the second RTP packet header further including a second RTP header extension, the at least second portion of the frame corresponding to a second PDU of the PDU Set;

extracting, by the network device and from the second RTP header extension, the video frame identifier for the at least second portion of the frame of video data;

determining, by the network device, a quality of service (QoS) flow identifier (QFI) for the PDU Set according to the video frame identifier; and performing, by the network device, QoS processing on the first RTP packet and the second RTP packet according to the QFI for the PDU Set.

2. The method of claim 1, wherein the video frame identifier comprises a picture order count (POC) value.

3. The method of claim 1, wherein the video frame identifier comprises a display frame identifier or a current frame identifier.

4. The method of claim 1, wherein the at least first portion of the frame comprises a first slice of the frame, the at least second portion of the frame comprises a second slice of the frame, the first RTP header extension includes a first slice identifier for the first slice, and the second RTP header extension includes a second slice identifier for the second slice.

5. The method of claim 1, wherein the at least first portion of the frame comprises a first tile of the frame, the at least second portion of the frame comprises a second tile of the frame, the first RTP header extension includes a first tile identifier for the first tile, and the second RTP header extension includes a second tile identifier for the second tile.

6. The method of claim 1, further comprising determining, using the video frame identifier, one or more of a frame type for the frame, a priority for the frame, or dependency information for the frame.

7. The method of claim 1, further comprising: extracting, from the first RTP header extension, one or more of a network abstraction layer (NAL) unit type for the at least first portion of the frame, a temporal identifier (TID) for the at least first portion of the frame, a layer identifier (LID) for the at least first portion of the frame, data indicating whether the at least first portion of the frame is intra-prediction coded, or data indicating whether the at least first portion is discardable.

8. The method of claim 1, further comprising processing a network abstraction layer (NAL) unit header for the frame, the NAL unit header including data indicating a priority value for the frame.

9. The method of claim 1, further comprising processing an access unit delimiter (AUD) for an access unit corresponding to the frame, the AUD including data representing a priority value for the access unit.

10. The method of claim 1, further comprising processing a picture header for the frame, the picture header including data representing a priority value for the frame.

11. The method of claim 1, further comprising processing an open bitstream unit (OBU) for the at least portion of the frame, the OBU including data representing a priority value for the at least portion of the frame.

12. The method of claim 11, wherein the OBU comprises one of a frame header OBU or a metadata OBU.

13. The method of claim 1, further comprising receiving data indicating a picture distance between the frame and a reference frame for the frame.

14. The method of claim 13, wherein receiving the data indicating the picture distance comprises receiving a network abstraction layer (NAL) unit including the data or a supplemental enhancement information (SEI) message including the data.

15. The method of claim 13, wherein receiving the data indicating the picture distance between the frame and the reference frame for the frame comprises receiving data indicating picture distances between the frame and each active reference frame.

16. The method of claim 1, further comprising receiving information indicating whether the at least second portion of the frame of video data can be decoded without the at least first portion of the frame.

17. The method of claim 16, wherein the information indicates whether the second PDU can be decoded without the first PDU of the PDU Set.

18. The method of claim 1, further comprising receiving information indicating whether loop filtering is to be performed across one or more boundaries between the at least first portion of the frame and one or more other portions, including the at least second portion, of the frame.

19. The method of claim 1, further comprising receiving information indicating whether the at least second portion of the frame is independently coded without prediction from other portions, including the at least first portion, of the frame.

20. The method of claim 1, further comprising receiving data indicating that the frame is a discardable frame.

21. The method of claim 20, wherein receiving the data indicating that the frame is the discardable frame comprises receiving the frame in a network abstraction layer (NAL) unit, an access unit delimiter, a picture header, a slice header, a supplemental enhancement information (SEI) message, or a frame header open bitstream unit (OBU).

22. The method of claim 1, further comprising:

determining that the frame is a gradual decoder refresh (GDR) frame and that the at least second portion of the frame is independently coded; and in response to determining that the at least second portion of the frame is independently coded, sending the at least second portion of the frame to the destination device.

23. The method of claim 1, further comprising:

determining that the frame is a gradual decoder refresh (GDR) frame and that the at least first portion of the frame is coded relative to a reference frame;

determining that the GDR frame is an ordinal first frame retrieved for a bitstream including the video data such that the reference frame has not been retrieved; and in response to the reference frame having not been retrieved, discarding the at least first portion of the frame of video data.

24. The method of claim 1, wherein the network device comprises a user plane function (UPF) device.

25. A network device for transporting video data from a source device to a destination device, the network device comprising:

a memory; and a processing system comprising one or more processors implemented in circuitry, the processing system being configured to:

receive a first real-time transport protocol (RTP) packet from the source device destined for the destination device, the first RTP packet including a first RTP packet header and a first payload including at least a first portion of a frame of video data, the first RTP packet header being separate from the first payload, the first RTP packet header further including a first RTP header extension, the at least first portion of the frame corresponding to a first protocol data unit (PDU), the frame of video data corresponding to a protocol data unit (PDU) Set including the first PDU;

extract, from the first RTP header extension, a video frame identifier for the at least first portion of the frame of video data, the video frame identifier indicating a display order value for the at least first portion of the frame;

receive a second RTP packet from the source device destined for the destination device, the second RTP packet including a second RTP packet header and a second payload including at least a second portion of the frame of video data, the second RTP packet header being separate from the second payload, the second RTP packet header further including a second RTP header extension, the at least second portion of the frame corresponding to a second PDU of the PDU Set;

extract, from the second RTP header extension, the video frame identifier for the at least second portion of the frame of video data;

determine a quality of service (QoS) flow identifier (QFI) for the PDU Set according to the video frame identifier; and perform QoS processing on the first RTP packet and the second RTP packet according to the QFI for the PDU Set.

26. The device of claim 25, wherein the video frame identifier comprises at least one of a picture order count (POC) value, a display frame identifier, or a current frame identifier.

27. The device of claim 25, wherein the at least portion of the frame comprises a slice of the frame or a tile of the frame, and wherein the video frame identifier includes an identifier for the slice of the frame or the tile of the frame.

28. The device of claim 25, wherein the processing system is configured to determine, using the video frame identifier, one or more of a frame type for the frame, a priority for the frame, or dependency information for the frame.

29. The device of claim 25, wherein the processing system is further configured to extract, from the first RTP header extension, one or more of a network abstraction layer (NAL) unit type for the at least first portion of the frame, a temporal identifier (TID) for the at least first portion of the frame, a layer identifier (LID) for the at least first portion of the frame, data indicating whether the at least first portion of the frame is intra-prediction coded, or data indicating whether the at least first portion is discardable.

30. The device of claim 25, wherein the processing system is further configured to process a network abstraction layer (NAL) unit header for the frame, the NAL unit header including data indicating a priority value for the frame.

31. The device of claim 25, wherein the processing system is further configured to process an access unit delimiter (AUD) for an access unit corresponding to the frame, the AUD including data representing a priority value for the access unit.

32. The device of claim 25, wherein the processing system is further configured to process a picture header for the frame, the picture header including data representing a priority value for the frame.

33. The device of claim 25, wherein the processing system is further configured to process an open bitstream unit (OBU) for the at least portion of the frame, the OBU including data representing a priority value for the at least portion of the frame.

34. The device of claim 25, wherein the processing system is further configured to receive data indicating a picture distance between the frame and a reference frame for the frame, the data being included in a network abstraction layer (NAL) unit or a supplemental enhancement information (SEI) message.

35. The device of claim 25, wherein the processing system is further configured to receive information indicating whether the at least second portion of the frame of video data can be decoded without other portions, including the at least first portion, of the frame.

36. The device of claim 25, wherein the processing system is further configured to receive information indicating whether loop filtering is to be performed across one or more boundaries between the at least first portion of the frame and one or more other portions, including the at least second portion, of the frame.

37. The device of claim 25, wherein the processing system is further configured to:

determine that the frame is a gradual decoder refresh (GDR) frame and that the at least second portion of the frame is independently coded; and in response to determining that the at least second portion of the frame is independently coded, send the at least second portion of the frame to the destination device.

38. The device of claim 25, wherein the processing system is further configured to:

determine that the frame is a gradual decoder refresh (GDR) frame and that the at least first portion of the frame is coded relative to a reference frame;

determine that the GDR frame is an ordinal first frame retrieved for a bitstream including the video data such that the reference frame has not been retrieved; and in response to the reference frame having not been retrieved, discard the at least first portion of the frame of video data.

39. The network device of claim 25, wherein the network device comprises a user plane function (UPF) device.

40. A network device for transporting video data from a source device to a destination device, the network device comprising:

means for receiving a first real-time transport protocol (RTP) packet from the source device destined for the destination device, the first RTP packet including a first RTP packet header and a first payload including at least a first portion of a frame of video data, the first RTP packet header being separate from the first payload, the first RTP packet header further including a first RTP header extension, the at least first portion of the frame corresponding to a first protocol data unit (PDU), the frame of video data corresponding to a protocol data unit (PDU) Set including the first PDU;

means for extracting, from the first RTP header extension, a video frame identifier for the at least first portion of the frame of video data, the video frame identifier indicating a display order value for the at least first portion of the frame;

means for receiving a second RTP packet from the source device destined for the destination device, the second RTP packet including a second RTP packet header and a second payload including at least a second portion of the frame of video data, the second RTP packet header being separate from the second payload, the second RTP packet header further including a second RTP header extension, the at least second portion of the frame corresponding to a second PDU of the PDU Set;

means for extracting, from the second RTP header extension, the video frame identifier for the at least second portion of the frame of video data;

means for determining a quality of service (QoS) flow identifier (QFI) for the PDU Set according to the video frame identifier; and means for performing QoS processing on the first RTP packet and the second RTP packet according to the QFI for the PDU Set.

41. A non-transitory computer-readable storage medium having stored thereon instructions that, when executed, cause a processor of a network device between a source device and a destination device to:

receive a first real-time transport protocol (RTP) packet from the source device destined for the destination device, the first RTP packet including a first RTP packet header and a first payload including at least a first portion of a frame of video data, the first RTP packet header being separate from the first payload, the first RTP packet header further including a first RTP header extension, the at least first portion of the frame corresponding to a first protocol data unit (PDU), the frame of video data corresponding to a protocol data unit (PDU) Set including the first PDU;

extract, from the first RTP header extension, a video frame identifier for the at least first portion of the frame of video data, the video frame identifier indicating a display order value for the at least first portion of the frame;

receive a second RTP packet from the source device destined for the destination device, the second RTP packet including a second RTP packet header and a second payload including at least a second portion of the frame of video data, the second RTP packet header being separate from the second payload, the second RTP packet header further including a second RTP header extension, the at least second portion of the frame corresponding to a second PDU of the PDU Set;

extract, from the second RTP header extension, the video frame identifier for the at least second portion of the frame of video data;

determine a quality of service (QoS) flow identifier (QFI) for the PDU Set according to the video frame identifier; and perform QoS processing on the first RTP packet and the second RTP packet according to the QFI for the PDU Set.

* * * * *